UNITED STATES PATENT OFFICE.

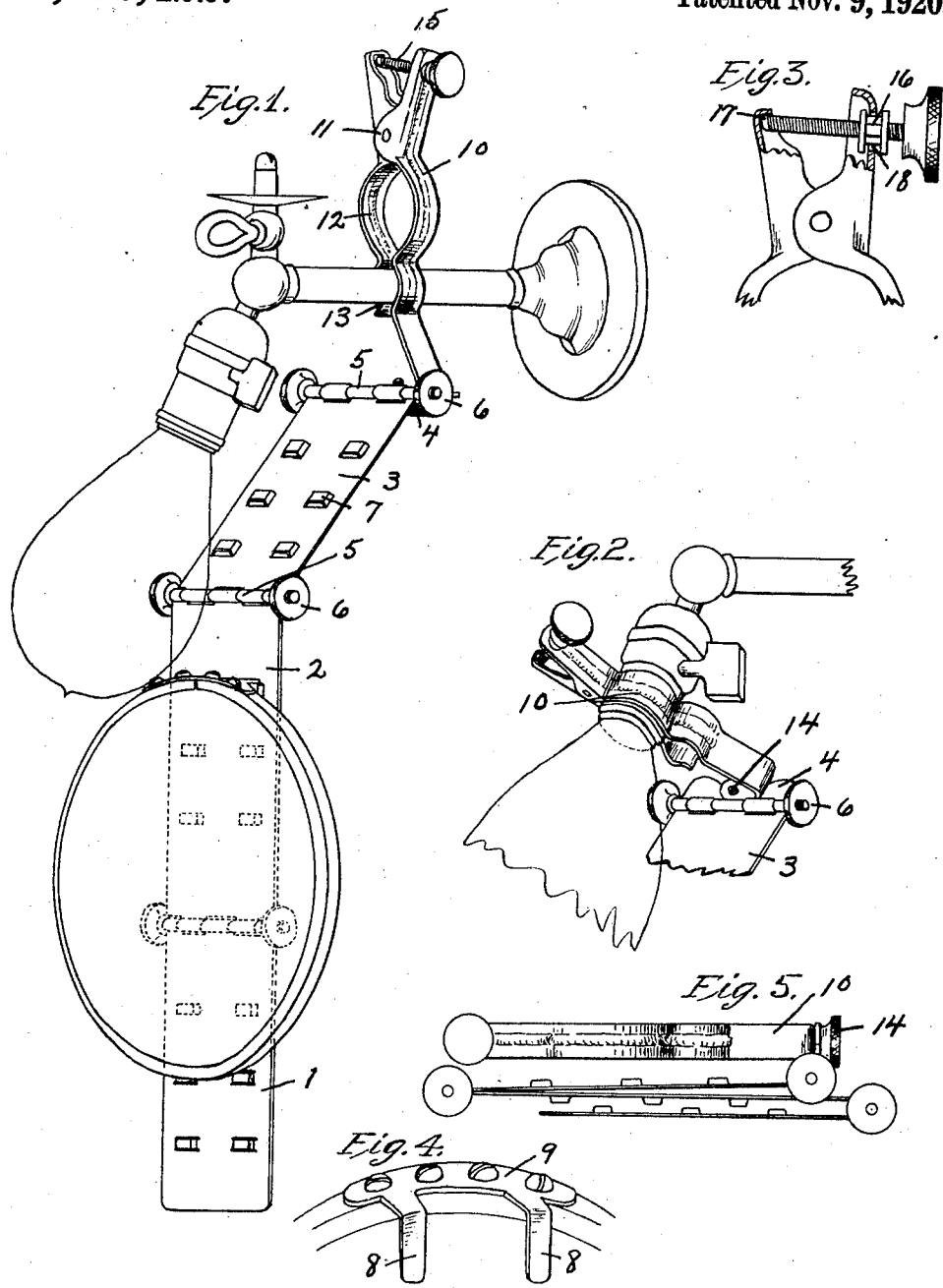

SALVATOR D'ESOPO, OF HARTFORD, CONNECTICUT.

MIRROR-BRACKET.

1,358,422.

Specification of Letters Patent.    Patented Nov. 9, 1920.

Application filed November 17, 1915.   Serial No. 62,049.

*To all whom it may concern:*

Be it known that I, SALVATOR D'ESOPO, a citizen of the United States, residing at Hartford, in the county of Hartford and State of Connecticut, have invented certain new and useful Improvements in Mirror-Brackets, of which the following is a specification.

One object of the invention is to provide an adjustable mirror bracket whereby a mirror may be held at the proper height and angle adjacent a light.

A further object is to provide a mirror bracket so constructed that it may be collapsed into a compact position for packing.

A further object is to provide common means for holding a bead on the mirror and for holding said mirror in the proper place on an adjustable member of said bracket.

A further object is to provide an adjustable mirror bracket with suitable means for clamping the same in the desired location.

To these ends and also to improve generally upon devices of the class specified the invention consists in the matters hereinafter described and claimed.

Figure 1, is a perspective view of the device secured to a combination electric and gas light fixture.

Fig. 2, is a sectional view showing the device clamped to an electric light socket.

Fig. 3, is a sectional view partially in cross-section of the clamping device for holding the mirror bracket in place.

Fig. 4, is an enlarged sectional view of the rear of the mirror showing the common means for holding a split ring bead around the mirror and at the same time for holding the mirror in its proper location on the mirror bracket.

Fig. 5, is a lateral view of the bracket in its collapsed position.

Referring to the drawings as the illustrated embodiment of the invention a plurality of members 1, 2, 3, and 4 preferably made of sheet metal are pivotally secured to each other as at 5 and when adjusted to a desired angle are secured in that desired position by the binding screws —6—. Preferably on each of the above said members are a plurality of means for holding a mirror such as loops —7— struck up with openings thereunder adapted to receive prongs —8— on a single metallic piece —9— which is screwed on to the respective ends of a split ring bead adapted to hold a mirror.

As a preferred means of holding the bracket in its proper location a clamp —10— having a pair of jaws pivotally secured together as at —11— has preferably two circular gripping surfaces as at —12— and —13— of different sizes so that it can be secured to any suitable fixture adjacent a light. One arm of the clamp —10— is secured to the member —4— by suitable means such as a binding screw —14— and the jaws of the clamp —10— are operated by floating means such as a screw —15— in threaded engagement with a nut —16— while the end of the screw engages a socket as at —17—. The nut —16— having a squared shank and flanges at each end thereof rides in a slot —18— and floats securely therein so that when the jaws are opened or closed by turning the screw the threads of the screw will not be stripped.

The invention has been shown and described for purposes of illustration as being constructed in a specified manner, but it is obvious that the invention is not limited either to the particular form or to the construction and arrangement of parts herein shown and described, since various modifications will suggest themselves to those skilled in the art without departing from the spirit of the invention, the scope of which is set forth in the annexed claims.

What I claim is—

1. In a mirror bracket, a bracket supporting member having a socket for attaching said bracket to a light fixture, a flat mirror supporting member secured to said bracket support by a pivot arranged on said bracket supporting member with respect to said socket to present the flat face of the mirror supporting member directly toward the light on said lighting fixture, and means for removably attaching a mirror in different positions along said flat mirror supporting member.

2. In a mirror bracket, a bracket supporting member having a socket for attaching said bracket to a lighting fixture, a flat mirror supporting member secured to said bracket support by a pivot extending transversely to the axis of said socket whereby the flat face of the mirror support is arranged in a plane transverse to a plane passing laterally through said axis of said socket, a second bracket supporting member pivotally attached to that hereinbefore mentioned by a pivot arranged to permit the flat faces of said mirror supporting members to be placed in the same plane, and means for removably attaching a mirror in different positions along both of said mirror supporting members.

3. In a mirror bracket, a bracket supporting member having a socket for attaching said bracket to a lighting fixture, a flat mirror supporting member secured to said bracket support by a pivot arranged on said bracket supporting member transverse to the axis of said socket whereby said mirror supporting member may be presented with its flat face directly toward the light from said lighting fixture, a plurality of sets of mirror attaching means, each set containing a plurality of means for removably attaching a mirror in different positions along said flat supporting member, and a mirror having a plurality of attaching means to engage those of each of said sets.

In testimony whereof I affix my signature.

SALVATOR D'ESOPO.